United States Patent [19]

Higashi et al.

[11] Patent Number: 4,619,338
[45] Date of Patent: Oct. 28, 1986

[54] METHOD AND DEVICE FOR CONTROLLING POWER STEERING DEVICE

[75] Inventors: Katsumi Higashi; Sadao Takeshima, both of Higashimatsuyama, Japan

[73] Assignee: Jidosha Kiki Co., Ltd., Tokyo, Japan

[21] Appl. No.: 680,429

[22] Filed: Dec. 11, 1984

[30] Foreign Application Priority Data

Dec. 13, 1983 [JP] Japan .................................. 58-233679

[51] Int. Cl.[4] .............................................. B62D 5/04
[52] U.S. Cl. ..................................... 180/142; 180/79.1
[58] Field of Search ............... 180/142, 143, 141, 146, 180/140; 251/129.08; 74/388 PS

[56] References Cited

U.S. PATENT DOCUMENTS 3,952,510  4/1976  Peterson ............................. 180/141
4,055,232 10/1977  Moore ................................. 180/141
4,473,128  9/1984  Nakayama .......................... 180/142

FOREIGN PATENT DOCUMENTS 71262   4/1983  Japan ................................. 180/143
180380 10/1983  Japan ................................. 180/142
188754 11/1983  Japan ................................. 180/142

Primary Examiner—John J. Love
Assistant Examiner—Everett G. Diederiks, Jr.
Attorney, Agent, or Firm—Townsend & Townsend

[57] ABSTRACT

A method and device for controlling a power steering device wherein a flow control valve unit is arranged between an oil pump and a power steering unit, the flow control valve unit being controlled to supply oil to the power steering unit at a flow rate corresponding to a vehicle speed, has the steps of determining whether or not the flow rate of oil supplied to the power steering unit corresponds to a value required in accordance with current steering conditions, and increasing the flow rate to a value so as to correspond to the steering conditions when the flow rate does not correspond to the current steering conditions.

5 Claims, 9 Drawing Figures

METHOD AND DEVICE FOR CONTROLLING POWER STEERING DEVICE

BACKGROUND OF THE INVENTION

The present invention relates to a method and device for controlling a power steering device having a combination of a constant flow oil pump and a flow control valve.

A power steering device of this type controls a flow control valve in accordance with a vehicle speed, so that an oil flow varies widely in accordance with a given vehicle speed, thereby providing smooth steering operation. In this case, when a vehicle speed is increased, a smaller steering force is required. An oil flow rate is controlled to be decreased in accordance with an increase in vehicle speed. Therefore, a uniform and small steering force is required throughout the wide range of vehicle speeds. A flow rate of an oil supplied to a power steering unit is controlled to a predetermined value corresponding to a vehicle speed.

When a driver turns a steering wheel abruptly, a predetermined amount of oil must be supplied to the power steering unit within a short period of time. However, a sufficient amount of oil cannot be quickly supplied to the power steering unit, which requires a large steering force. The so-called steering wheel hitch phenomenon occurs wherein the driver temporarily feels heavy steering. In order to solve this problem, conventionally, a larger amount of oil than that required in correspondence with the current vehicle speed is supplied to the power steering unit. When a lower limit flow rate of oil supplied to the power steering unit is increased in this manner, a variable range of flow rates is narrowed since the upper limit is determined by a delivery rate of the oil pump. For this reason, any conventional system fails to satisfy the need for a uniform and small steering force throughout a wide range of vehicle speeds.

SUMMARY OF THE INVENTION

It is, therefore, a principal object of the present invention to provide a method and device for controlling a power steering device, wherein flow rates of oil supplied to a power steering unit have a wide range without temporarily and abruptly increasing a steering force, and a uniform and small steering force can be obtained throughout a wide range of vehicle speeds.

In order to achieve the above object of the present invention, a power steering control device discriminates whether or not a flow rate of oil supplied to a power steering unit at the time of steering corresponds to a value given in accordance with steering conditions. When the flow rate is smaller than the given value, the flow rate is increased.

According to an aspect of the present invention, therefore, there is provided a method of controlling a power steering device wherein a flow control valve unit is arranged between an oil pump and a power steering unit, the flow control valve unit being controlled to supply to the power steering unit oil at a flow rate corresponding to a vehicle speed, comprising the steps of determining whether or not the flow rate of oil supplied to the power steering unit corresponds to a value required in accordance with current steering conditions, and increasing the flow rate to the value so as to correspond to the current steering conditions when the flow rate of oil does not correspond to the current steering conditions.

According to another aspect of the present invention, there is provided a device for controlling a power steering device having a flow control valve unit arranged between an oil pump and a power steering unit, the flow control valve unit being controlled to supply oil to the power steering unit at a flow rate corresponding to a vehicle speed, comprising: means for discriminating whether or not one of steering conditions required at the time of steering satisfies a required value; and means for increasing the flow rate to a value corresponding the steering conditions when the one of steering conditions does not satisfy the required value.

DESCRIPTION OF THE PREFERRED EMBODIMENTS

Figure 1:
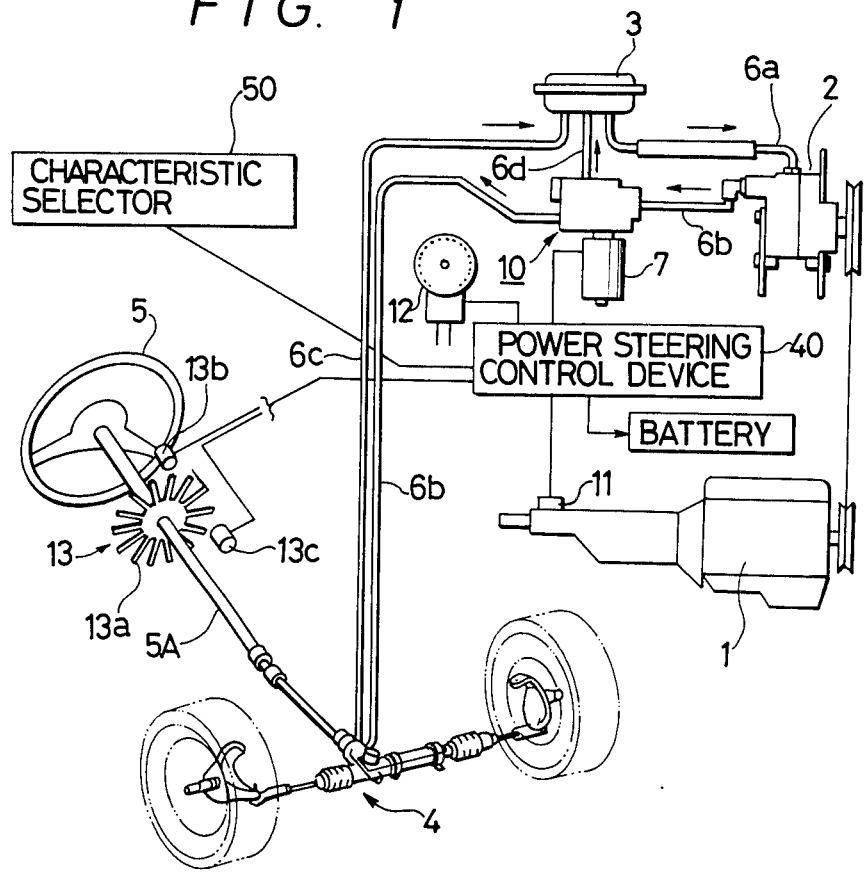
FIG. 1 is a system diagram showing a schematic configuration of a power steering device of a vehicle.

FIG. 1 shows the schematic configuration of a power steering device of a vehicle. Reference numeral 1 denotes a vehicle engine; and 2, an oil pump driven by the engine 1. Working oil under pressure is supplied by the oil pump 2 from an oil tank 3 to a power steering unit 4. When a driver turns a steering wheel in a desired direction, a control valve (not shown) in the power steering unit 4 is switched to operate a power cylinder (not shown). An output from the power cylinder is transmitted as an auxiliary force to a steering wheel 5. Reference numeral 6a denotes an oil intake pipe for supplying the oil from the oil tank 3 to the oil pump 2; 6b, an oil delivery pipe connected from the oil pump 2 to the power steering unit 4; and 6c, a return pipe connected from the power steering unit 4 to the oil tank 3 to allow excess oil to return to the oil tank 3.

In this embodiment, a separate control valve unit 10 is located in the downstream of the oil delivery pipe 6b, in addition to a first flow control unit which is incorporated in the oil pump 2 and which comprises an orifice and a flow control valve. The separate control valve unit 10 as a second flow control unit has a variable orifice 8 controlled by a solenoid 7 and a flow control valve 9 (see FIG. 4). The control valve unit 10 is controlled by a power steering control device 40 operated in response to a pulse obtained as a vehicle speed signal for every unit travel distance, a steering signal representing a steering angle of the steering wheel 5 and generated by a steering sensor 13, and an output from a characteristic selector 50. The vehicle speed signal is generated from a speed sensor 11 arranged on the engine 1 or a sensor in a speedometer (to be referred to as a vehicle speed sensor) 12. The steering sensor 13 is mounted on a steering column 5A situated between the steering wheel 5 and the power steering unit 4 connected to the steering wheel 5. The steering sensor 13 comprises a disk 13a fixed on the steering column 5A and having a number of radial slits, and a set of a light-emitting diode (LED) 13b and a phototransistor 13c which are arranged so as to sandwich the disk 13a and are parallel to the steering column 5A. When the steering wheel 5 is turned, the steering column 5A is rotated accordingly, and the phototransistor 13c generates pulses the number of which corresponds to the steering angle. Reference numeral 6d denotes a bypass pipe for bypassing excess oil from the flow control valve unit 10. With the characteristic selector 50, the driver manually selects one of several (three in this embodiment) characteristics which represents a desired relationship between the vehicle speed and the flow rate and which is given to the power steering unit 4. The detailed arrangement of the characteristic selector 50 will be described with reference to FIG. 8 later.

Figure 2:
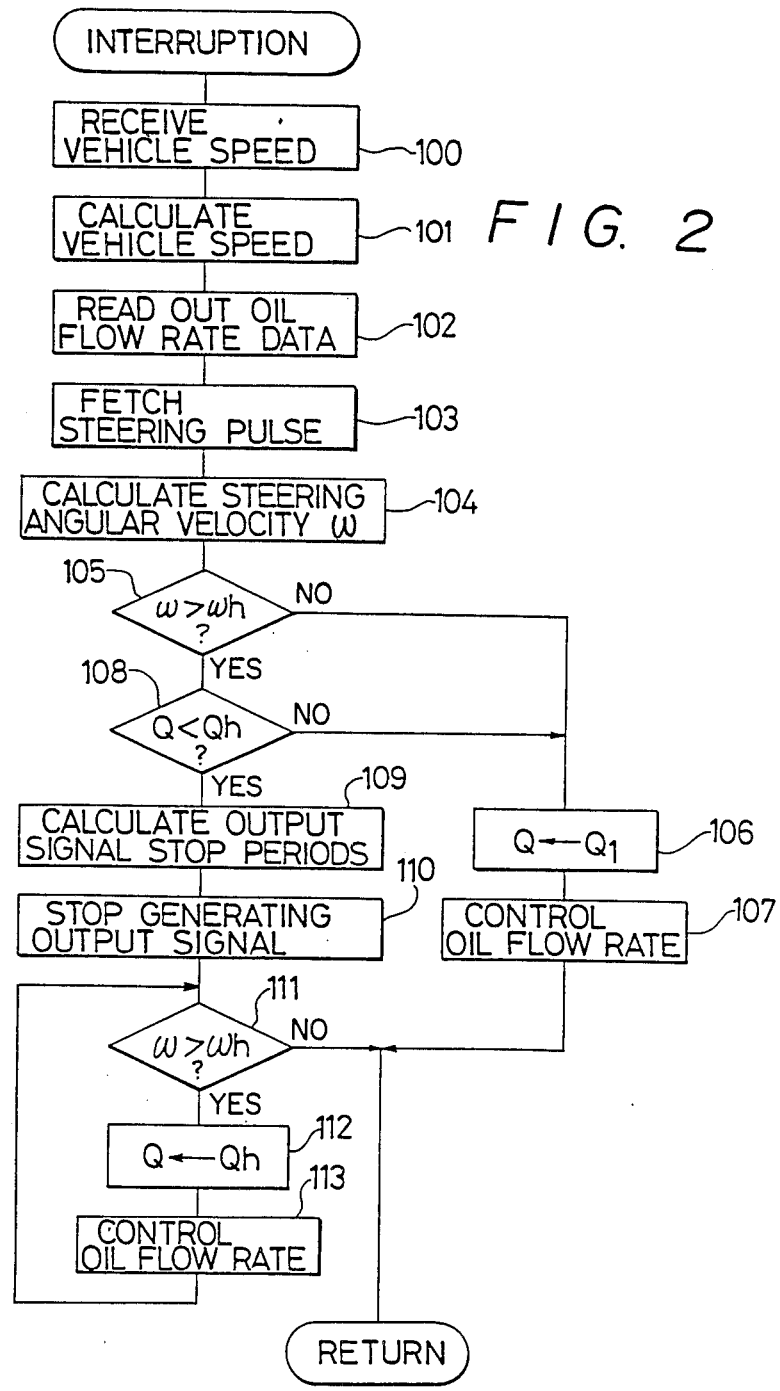
FIG. 2 is a flow chart for explaining the operation of a power steering control device shown in FIG. 1.
Figure 3:
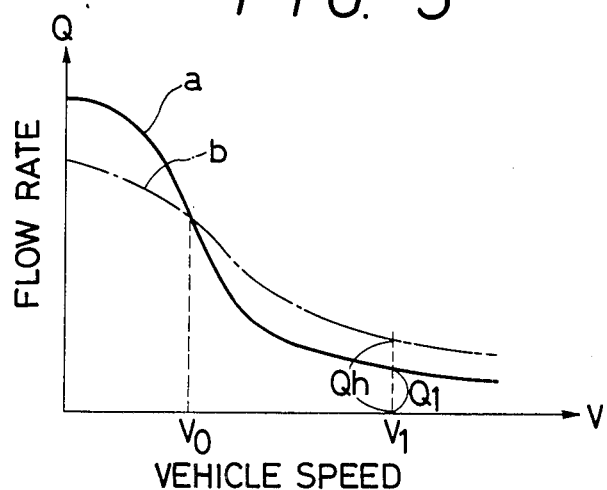
FIG. 3 is a graph showing the relationship between the vehicle speed and the flow rate of oil supplied to the power steering unit.

The power control device 40 with the above construction is operated in accordance with the flow chart in FIG. 2. When the vehicle speed pulse is generated from the vehicle speed sensor 11, an interrupt routine is executed in the power steering control device 40. In step 100, the power steering control device 40 receives the vehicle speed signal. In step 101, a vehicle speed is calculated in accordance with the vehicle speed signal. In step 102, a flow rate of oil corresponding to the calculated vehicle speed is read out. The readout flow rate data is read out among the characteristics determined in correspondence with the calculated vehicle speed, as shown in FIG. 3. Referring to FIG. 3, a characteristic curve (a) represents a flow rate of oil supplied to the power steering unit 4 during normal operation and a characteristic curve (b) represents the minimum flow rate of oil which does not cause the steering wheel hitch phenomenon. In step 102, flow rate data Q1 corresponding to current vehicle speed data V1 and corresponding minimum flow rate data Qh are read out.

When the flow rate data Q1 and Qh are read out in step 102, the control device 40 fetches the steering pulses from the steering sensor 13 in step 103 and calculates a steering angular velocity $\omega$. The control device 40 checks in step 105 whether the calculated value is larger than a maximum steering angular velocity $\omega h$. If NO in step 105, the calculated value does not represent abrupt steering. In step 106, the control device 40 adjusts the flow rate Q to be equal to the flow rate Q1 represented by the characteristic curve (a) in FIG. 3. Subsequently, in step 107, the flow rate of oil to be supplied to the power steering unit 4 is controlled.

However, if YES in step 105, the calculated steering angular velocity indicates abrupt steering. In this case, the control device 40 then checks in step 108 whether or not the flow rate Q1 is smaller than the minimum flow rate Qh. If NO in step 108, the flow rate Q1 controlled in correspondence with the current vehicle speed is larger than the minimum flow rate Qh which does not cause the steering wheel hitch phenomenon. This condition is satisfied when the current vehicle speed is lower than a vehicle speed V0. In this case, the steering wheel hitch phenomenon does not occur. Therefore, the control device 40 performs step 106 where the flow rate Q becomes the flow rate Q1 given by the characteristic curve (a) in FIG. 3. The controlled flow rate is supplied to the power steering unit 4, as indicated in step 107.

However, if YES in step 108, the flow rate Q1 controlled in correspondence with the current vehicle speed is smaller than the minimum flow rate Qh which does not cause the steering wheel hitch phenomenon. This condition is satisfied when the current vehicle speed is higher than a vehicle speed V0. In this case, the steering wheel hitch phenomenon occurs. Therefore, the control device 40 performs operations of step 109 and thereafter so as to prevent the steering wheel hitch phenomenon.

The operations of step 109 and thereafter will be described hereinafter. An output signal stop period S is calculated in step 109. In step 110, the control device 40 stops generating the signal for the calculated period, thereby deenergizing the solenoid 7 for controlling the flow control valve unit 10. This output signal stop period is required in the operation of the flow control valve unit 10 due to operation characteristics thereof, and a detailed description thereof will be made with reference to FIG. 4. The output signal stop period S is determined in accordance with a difference between the flow rate Qh which does not cause the steering wheel hitch phenomenon and the flow rate Q1 determined by the characteristic curve (a) in FIG. 3.

After step 110, the control device checks in step 111 whether or not condition $\omega > \omega h$ is established. Since the driving conditions are unchanged, the step is discriminated to be "YES" in the same manner as in step 105. As shown in step 112, the flow rate Q is controlled to match with the flow rate Qh which does not cause the steering wheel hitch phenomenon. The oil is supplied to the power steering unit 4 at the controlled flow rate. The flow returns to step 111. The operations in steps 111 to 113 are repeated while abrupt steering is being performed. When the steering state becomes normal and when NO in step 111, the flow returns to the main routine before the interrupt operation. The flow rate Q1 at the vehicle speed V1 is increased to the flow rate Qh, so that abrupt steering can be performed without causing the steering wheel hitch phenomenon. Therefore, smooth steering can be performed in a wide range of vehicle speeds irrespective of the steering conditions without causing the steering wheel hitch phenomenon.

The detailed construction of the flow control valve unit 10 combined with the solenoid 7 will be described hereinafter.

Figure 4:
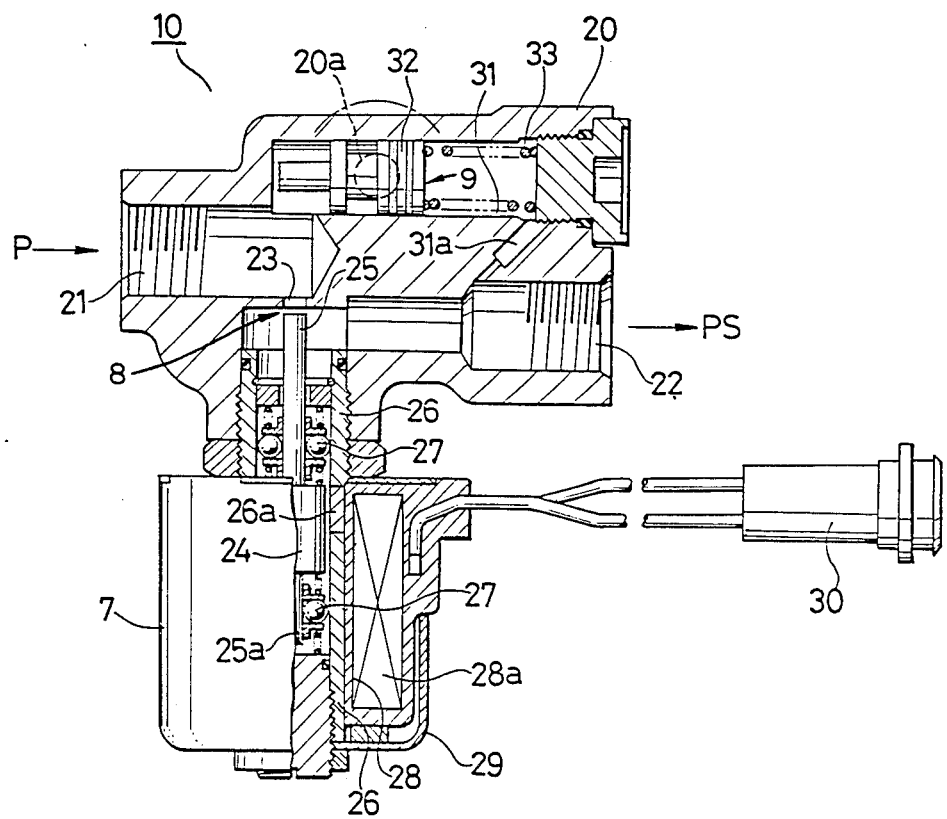
FIG. 4 is a sectional view of a control valve unit combined together with a solenoid coil shown in FIG. 1.

As shown in FIG. 4, the flow control valve unit 10 has a housing 20. Intake and delivery channels 21 and 22 are formed at two ends of the housing and at different phases so as to constitute compressed fluid paths. A small hole 23 is formed in a wall defining the channels 21 and 22. A valve rod 25 extending through a plunger 24 operated by the solenoid 7 can reciprocate with respect to the small hole 23. Reference numeral 26 denotes a sleeve having a nonmagnetic portion 26a at its intermediate portion. The nonmagnetic portion 26a slidably supports the plunger 24. Reference numeral 27 denotes bearings for respectively supporting the valve rod 25 and a rod portion 25a which are located outside the two ends of the plunger 24. Reference numeral 28 denotes a bobbin having a coil (solenoid coil) 28a wound therearound; 29, a shell; and 30, a connector connected to the control device 40.

A valve hole 31 is formed in the housing 20 to relieve a pressure difference before and behind the variable orifice constituted by the small hole 23 and the valve rod 25. A spool 32 constituting the second flow control valve unit is housed inside the housing 20 and is biased by a spring 33. When the spool 32 is operated by a change in the variable orifice opening, the compressed oil in the channel 21 returns to the oil tank 3 through a return port 20a and the pipe 6d.

Figure 5:
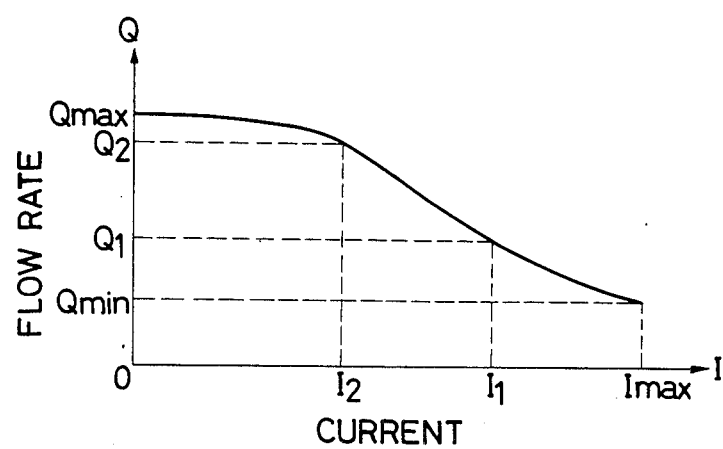
FIG. 5 is a graph showing the relationship between the current flowing through the solenoid coil of FIG. 1 and the flow rate of oil.
Figure 6:
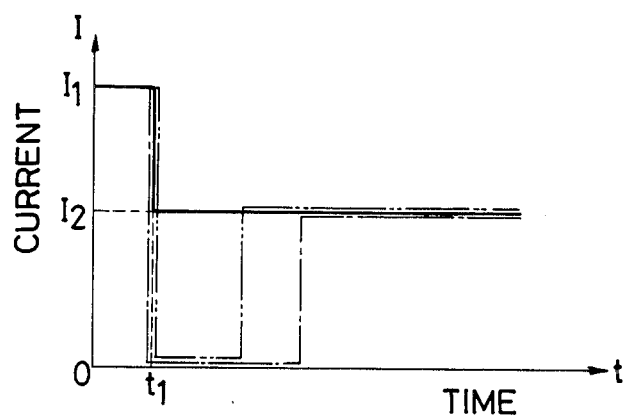
FIG. 6 is a graph showing the relationship between the current flowing through the solenoid coil and time.

The flow control valve unit 10 is arranged such that a flow rate of oil is increased when a current I supplied to the solenoid coil 28a of the solenoid 7 decreases, as shown in FIG. 5. For this reason, a predetermined flow rate Q1 is conventionally obtained by supplying a current I1 to the solenoid coil 28a. In order to obtain a flow rate Q2, a current flowing in the solenoid coil 28a is decreased to I2. As shown in FIG. 6, the current must be decreased from I1 to I2 at time t1. However, the flow rate Q cannot reach the flow rate Q2 due to a delay (e.g., 30 nsec) caused by an inductance of the solenoid coil 28a and the inertia force of the plunger. As indicated by the solid curve in FIG. 7, the flow rate Q1 becomes the flow rate Q2 when a delay time has elapsed.

Figure 7:
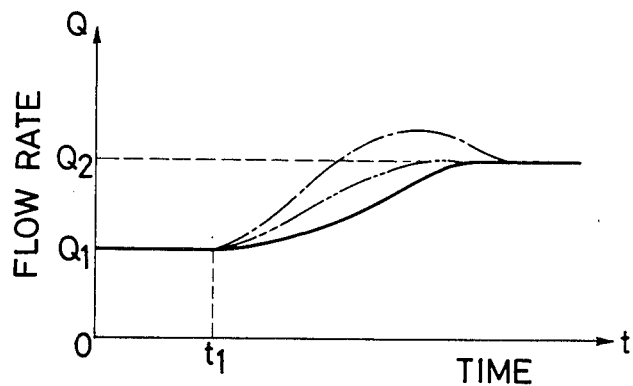
FIG. 7 is a graph showing the relationship between the flow rate of oil and time until the flow rate reaches a predetermined level.

In order to minimize the delay time, a ramp of the change portion of the flow rate in FIG. 7 must be abrupt. For this purpose, the flow rate is controlled to match with a maximum flow rate Qmax at time t1. When the flow rate has reached Q2, a current I2 is supplied to the solenoid coil 28a of the solenoid 7. In order to perform the above operation, the current flowing in the solenoid coil 28a of the solenoid 7 must be kept zero for a predetermined period of time. However, when the current stop period is excessively long, as indicated by the alternate long and short dashed line in FIG. 6, overshooting occurs as indicated by the alternate long and short dashed line in FIG. 7. Therefore, the current stop period is adjusted to a critical period represented by the alternate long and two short dashed line in FIG. 6. In this case, a critical flow rate is indicated by the alternate long and two short dashed line in FIG. 7. The solid lines, the alternate long and short dashed lines and the alternate long and two short dashed lines at time t1 and at the current I2 are slightly deviated, but they overlap in practice.

Figure 8:
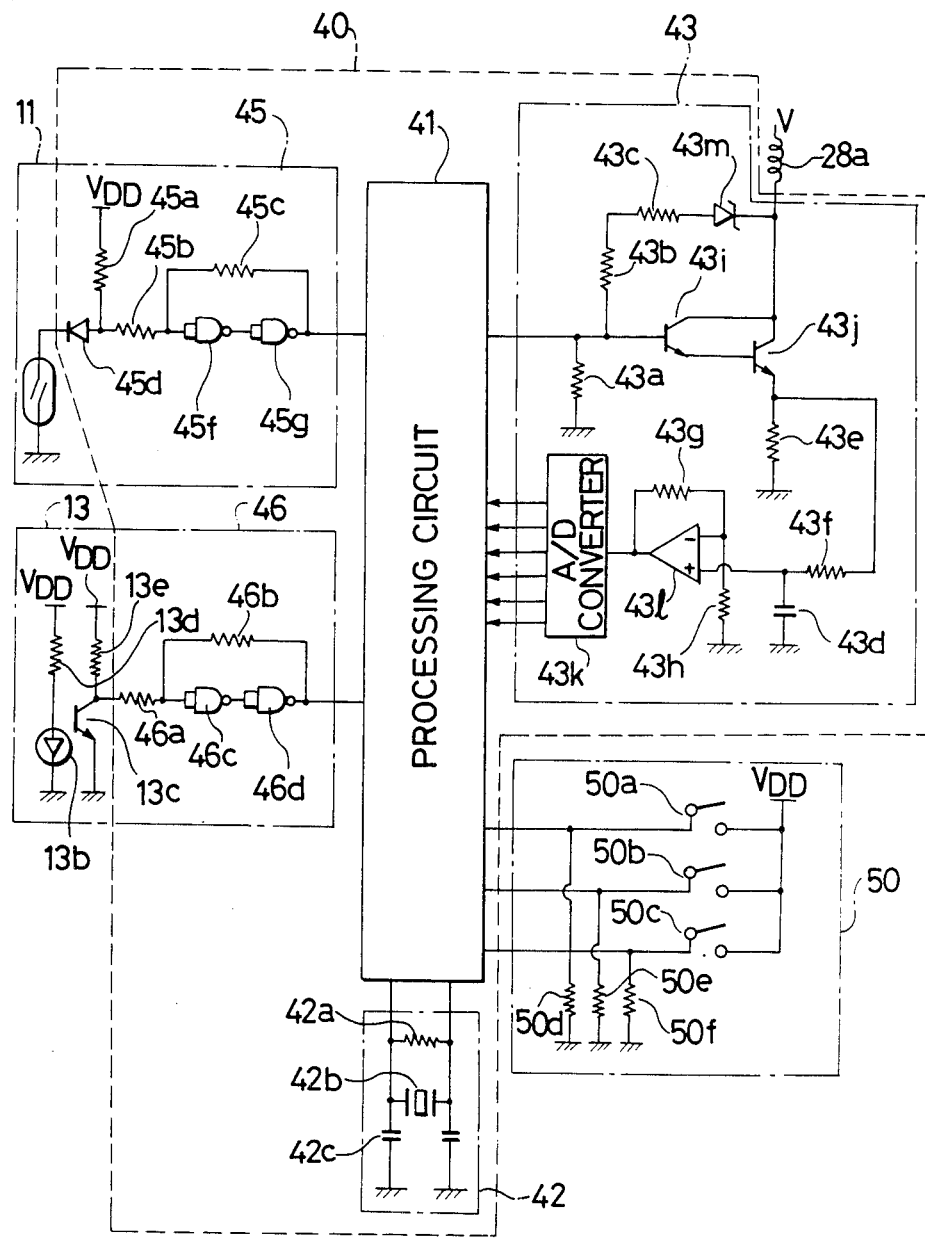
FIG. 8 is a circuit diagram showing the function blocks of the power steering control device.
Figure 9:
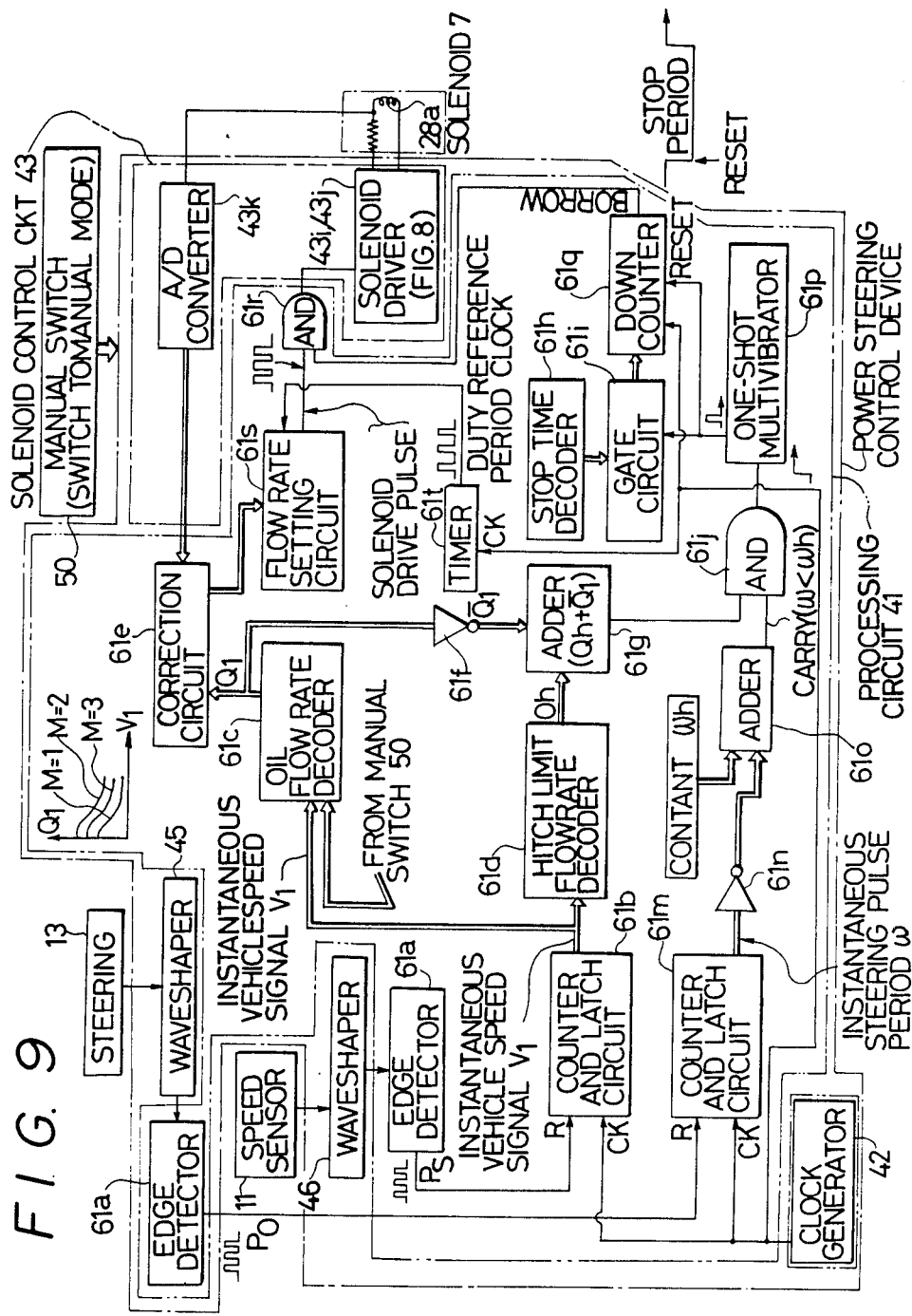
FIG. 9 is a block diagram showing the detailed arrangement of a processing circuit in the power steering control device shown in FIG. 8.

FIGS. 8 and 9 show the functional blocks of the power steering control device 40 together with the respective sensors and the characteristic selector 50.

The control device 40 in FIG. 8 comprises: a processing circuit 41 consisting of a microcomputer; a clock generator 42 for generating timing signals for driving the control system including the processing circuit 41 at predetermined intervals; a control circuit 43 arranged between the processing circuit 41 and the control valve unit 10 to control the flow rate of oil; a waveshaper 45 arranged between the speedometer (i.e., the vehicle speed sensor 11) and the processing circuit 41; and a waveshaper 46 arranged between the steering the steering sensor 13 and the processing circuit 41. The characteristic selector 50 is connected to the processing circuit 41 so as to cause the solenoid 7 to control the flow control valve unit 10, thus allowing the driver to manually select an oil flow rate characteristic to be supplied to the power steering unit by the flow control valve 10.

The waveshaper 45 comprises resistors 45a to 45c, a diode 45d and NAND gates 45f and 45g. The waveshaper 45 shapes the waveform of the vehicle speed pulses. The waveshaped signal from the waveshaper 45 is supplied to the processing circuit 41. The waveshaper 45 thus has a pull-up function when the vehicle speed sensor 11 is kept open.

The waveshaper 46 comprises resistors 46a and 46b and NAND gates 46c and 46d. The waveshaper 46 shapes the waveform of the steering pulses supplied from the phototransistor 13c. The waveshaped signal is then supplied to the processing circuit 41. It should be noted that elements 13d and 13e constituting the steering sensor 13 comprise resistors.

The solenoid control circuit 43 comprises: a current control circuit section for controlling a current flowing through the solenoid coil 28a of the solenoid 7 in response to a control signal obtained in accordance with the vehicle speed signal from the vehicle speed sensor 11, the steering signal from the steering sensor 13, and the signal from the characteristic selector 50; and a current detector for detecting the current flowing through the solenoid coil 28a. The solenoid control circuit 43 performs the control operation in response to an output from the processing circuit 41. More particularly, the solenoid control circuit 43 comprises resistors 43a to 43c, resistors 43g and 43h, a capacitor 43d, transistors 43i and 43j, a differential amplifier 43l, a Zener diode 43m and an A/D converter 43k. A resistor 43e converts a current flowing through the solenoid coil 28a to a voltage. This voltage is amplified by the differential amplifier 43l, and an amplified voltage is converted by the A/D converter 43k to a digital signal. This digital signal is supplied to the processing circuit 41.

The characteristic selector 50 connected to the processing circuit 41 comprises three manual switches 50a to 50c and resistors 50d to 50f. When a desired switch among the manual switches 50a to 50c is closed, an input to the processing circuit 41 is set at high level. However, when the switch is opened, the voltage signal is pulled down by the resistors 50d to 50f, so that an input to the processing circuit 41 is low level. When one of the switches 50a to 50c is closed, the processing circuit 41 performs oil flow rate control for the power steering unit 4 in accordance with the corresponding characteristics representing the relationship between the vehicle speed and the oil flow rate.

The clock generator 42 comprises a resistor 42a, a ceramic oscillator 42b, and capacitors 42c and 42d. The clock generator 42 generates a pulse signal having a predetermined period.

The processing circuit 41 performs the control operation of FIG. 2 in accordance with a program written in a memory in the processing circuit 41 when one of the switches 50a to 50c of the characteristic selector 50 is closed. The control operation will be described in detail with reference to the function blocks in FIG. 9.

The vehicle velocity signal from the vehicle velocity sensor 11 is supplied to an edge detector 61a through the waveshaper 45. The edge detector 61a detects a trailing edge of the waveshaped pulse. A detection pulse Ps from the edge detector 61a is supplied to a counter and latch circuit 61b. The counter and latch circuit 61b calculates an instantaneous vehicle speed. The counter and latch circuit 61b is reset every time it receives the output pulse Ps from the edge detector 61a. The counter and latch circuit 61b starts counting clock pulses supplied from the reference clock generator 42 and also latches a count every time it is reset in response to the output pulse Ps. The latched value is generated as an instantaneous vehicle speed signal V1.

The instantaneous vehicle speed signal V1 is supplied to an oil flow rate decoder 61c and a hitch limit flow rate decoder 61d which determine a duty ratio of ON-/OFF operation of the solenoid coil 28a and hence the solenoid 7.

The decoder 61c generates the flow rate signal Q1 corresponding to the instantaneous vehicle speed signal V1 in accordance with the output from the manually operated characteristic selector 50. The flow rate signal Q1 is supplied to an adder 61g through a correction circuit 61e and an inverter 61f.

The adder 61g also receives an output Qh from the decoder 61d. The output Qh represents a minimum flow rate of oil which does not cause the steering wheel hitch phenomenon at the given instantaneous vehicle speed. Therefore, the adder 61d adds an inverted output $\overline{Q1}$ of the output from the decoder 31c and the output Qh. A sum from the adder 61d is supplied to a stop time decoder 61h which then calculates a signal stop period for which the solenoid coil 28a of the solenoid 7 is kept off. The output from the decoder 61h is supplied to a gate circuit 61i. It should be noted that the adder 61g generates a carry signal to one input terminal of an AND gate 61j when condition Qh>Q1 is satisfied, i.e., when the flow rate Qh is larger than the flow rate Q1.

The steering signal from the steering sensor 13 is supplied to an edge detector 61l through the waveshaper 46. The edge detector 61l detects a trailing edge of a waveshaped pulse, and a detection signal Po therefrom is supplied to a counter and latch circuit 61m. The counter and latch circuit 61m determines an instantaneous steering angular velocity pulse period and is reset in response to the pulse Po from the edge detector 61l. The counter and latch circuit 61m then starts counting the clock pulses from the reference clock generator 42. The counter and latch circuit 61m latches a current count every time it is reset in response to the pulse Po. The latched signal is generated as an instantaneous steering angular velocity $\omega$. The instantaneous steering angular velocity signal $\omega$ is inverted by an inverter 61n, and an inverted pulse $\overline{\omega}$ is supplied to one input terminal of an adder 61o.

The adder 61o also receives a maximum steering angular velocity signal h which is then added to the inverted output $\overline{\omega}$. When condition $\omega h > \omega$ is established, a carry signal is generated from the adder 61o and is supplied to the AND gate 61j. When the AND gate 61j receives high level signals, it supplies an output to a one-shot multivibrator 61p which generates a one-shot pulse. The gate circuit 61i is enabled in response to the one-shot pulse, and stop time data as a preset value is supplied to a down counter 61q. The down counter 61q is reset in response to the leading edge of the one-shot pulse from the one-shot multivibrator 61p. Thereafter, the down counter 61q receives the stop time decoder output through the gate and presets it. The down counter 61q performs a subtraction every time it receives a clock pulse. When the stop period has elapsed, the down counter supplies a borrow output to an AND gate 61r.

The correction circuit 61e corrects a change in current flowing through the solenoid coil 28a through the A/D converter 43k in the solenoid control circuit 43. This change in current occurs in accordance with a change in temperature of the solenoid coil 28a. The corrected flow rate signal is supplied to a flow rate setting circuit 61s. The flow rate setting circuit 61s receives a duty reference period clock from a timer 61t to modify the duty reference period clock such that the flow rate matches with the flow rate Q1. The modified pulse is supplied as a solenoid drive pulse to the AND gate 61r. After the borrow output is supplied from the down counter 61q to the AND gate 61r, the AND gate 61r supplies to solenoid drivers (43i and 43j in FIG. 8) a solenoid drive pulse as the output generated from the flow rate setting circuit 61s, thereby energizing the solenoid coil 28a. A change in voltage at a common junction between the solenoid coil 28a and the resistor 43e is corrected by the correction circuit 61e through the A/D converter 43k, as previously described. The timer 61t receives the clock pulse CK from the reference clock generator 42 and generates the duty reference clock period.

What is claimed is:

1. In a method of controlling a power steering device having a flow control valve unit coupled to an oil pump and a power steering unit wherein the flow control valve is controlled to supply to the power steering unit oil at a flow rate corresponding to a vehicle speed by determining a normal oil flow rate for a given speed and causing the flow control valve to supply oil to the power steering unit at the normal rate, the improvement including the steps of:
   (a) determining steering angular velocity;
   (b) comparing the normal oil flow rate with a predetermined minimum oil flow rate when the steering angular velocity exceeds a threshold value;
   (c) supplying oil to the power steering unit at the normal rate when the normal rate exceeds the predetermined minimum rate; and
   (d) supplying oil to the power steering unit at the predetermined minimum rate when the normal rate does not exceed the predetermined minimum rate by initially increasing the oil flow rate to a maximum value higher than said predetermined minimum rate for a period of time determined by the vehicle speed, and reducing the oil flow rate to said predetermined minimum rate after said period of time has elapsed.

2. The method of claim 1 further including the step of providing a plurality of selectable flow rate versus vehicle speed characteristics.

3. In a system for controlling a power steering device having a flow control valve unit coupled to an oil pump and a power steering unit, means for determining vehicle speed, means for determining steering angular velocity, and control means coupled to said flow control valee unit for controlling the flow rate of supplied by said flow control valve unit to said power steering unit in accordance with vehicle speed, the improvement wherein said control means includes:
   means for determining normal oil flow rate for a given vehicle speed;
   means for comparing steering angular velocity with a threshold value;
   means for comparing the normal oil flow rate with a predetermined minimum oil flow rate when the steering angular velocity exceeds said threshold value; and
   supply means for controlling the flow control valve unit to supply oil to the power steering unit at said normal rate when said normal rate exceeds said predetermined minimum rate and for controlling the flow control valve unit to supply oil to the power steering unit at said predetermined minimum rate when said normal rate does not exceed said predetermined minimum rate, said supply means including means for controlling the flow control valve unit to supply oil to the power steering unit at an initial higher flow rate than said predetermined minimum rate for a time period determined by the vehicle speed when said normal rate does not exceed said predetermined minimum rate.

4. The invention of claim 3 wherein said flow control valve unit includes an electrically operable valve, and wherein said supply means for regulating the application of electrical power to said valve to alternately effect said normal oil flow rate, said initially higher oil flow rate, and said predetermined minimum oil flow rate.

5. The invention of claim 3 wherein said system further includes means coupled control means for selectably providing a plurality of flow rate versus vehicle speed characteristics.

* * * * *